(12) United States Patent
Saad et al.

(10) Patent No.: US 11,240,142 B2
(45) Date of Patent: Feb. 1, 2022

(54) CLASS-BASED TRAFFIC ENGINEERING IN AN IP NETWORK

(71) Applicant: Juniper Networks, Inc., Sunnyvale, CA (US)

(72) Inventors: Tarek Saad, Ottawa (CA); Raveendra Torvi, Nashua, NH (US); Vishnu Pavan Beeram, Ashburn, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 203 days.

(21) Appl. No.: 16/587,547

(22) Filed: Sep. 30, 2019

(65) Prior Publication Data

US 2020/0403902 A1 Dec. 24, 2020

Related U.S. Application Data

(60) Provisional application No. 62/864,851, filed on Jun. 21, 2019.

(51) Int. Cl.
*H04L 12/721* (2013.01)

(52) U.S. Cl.
CPC ............ *H04L 45/124* (2013.01); *H04L 45/38* (2013.01)

(58) Field of Classification Search
CPC ..... H04L 45/124; H04L 45/302; H04L 45/38; H04L 45/50; H04L 47/724; H04L 47/80
See application file for complete search history.

(56) References Cited

U.S. PATENT DOCUMENTS

| | | | |
|---|---|---|---|
| 2012/0057593 A1* | 3/2012 | Chen | H04L 45/02 370/390 |
| 2012/0092986 A1* | 4/2012 | Chen | H04L 45/28 370/228 |
| 2012/0224506 A1 | 9/2012 | Gredler et al. | |

OTHER PUBLICATIONS

Amante et al. "IPv6 Flow Label Specification" Internet Engineering Task Force (IETF), RFC 6437, Nov. 2011, 15 pp.
Dreibholz, T. "An IPv4 Flowlabel Option" draft-dreibholz-ipv4-flowlabel-29, Network Working Group, Internet-Draft, Mar. 6, 2019, 9 pp.
Marques et al., "Dissemination of Flow Specification Rules," Network Working Group, RFC 5575, Aug. 2009, 23 pp.

(Continued)

*Primary Examiner* — Khoa Huynh
(74) *Attorney, Agent, or Firm* — Shumaker & Sieffert, P.A.

(57) ABSTRACT

Techniques are described for class-based traffic engineering in an IP network. For example, routers of an IP network may establish one or more constrained traffic engineered paths using a link-state protocol (e.g., IGP) without using signaling protocols, such as RSVP or SPRING, or encapsulating packets over MPLS. For example, an egress router of the IP network may receive a capability message specifying the capability of routers to compute a constrained path to the egress router, wherein the capability message comprises path computation information including an identifier of a path computation algorithm to be used by the one or more of the plurality of network devices to reach the egress network device. The egress router may advertise a reachability message including a destination IP prefix and the identifier of the path computation algorithm to cause routers in the IP network to compute the constrained path to reach the egress router.

19 Claims, 4 Drawing Sheets

(56) References Cited

OTHER PUBLICATIONS

Le Faucheur et al. "Use of Interior Gateway Protocol (IGP) Metric as a second MPLS Traffic Engineering (TE) Metric" Network Working Group, RFC 3785, May 2004, 8 pp.
Previdi et al. "IS-IS Traffic Engineering (TE) Metric Extensions" Internet Engineering Task Force (IETF), RFC 7810, May 2016, 18 pp.
Lee et al. "Exclude Routes—Extension to Resource ReserVation Protocol-Traffic Engineering (RSVP-TE)" Network Working Group, RFC 4874, Apr. 2007, 27 pp.
Moy, "OSPF Version 2," Network Working Group, RFC 2328, Apr. 1998, 244 pp.
Sheth et al., "OSPF Hybrid Broadcast and Point-to-Multipoint Interface Type," Internet Engineering Task Force (IETF), RFC 6845, Jan. 2013, 9 pp.
Coltun et al., "OSPF for IPv6," RFC 5340, Network Working Group, Jul. 2008, 94 pp.
Lindem et al., "OSPFv3 LSA Extendability," Network Working Group Internet Draft, draft-acee-ospfv3-lsa-extend-01.txt, Jul. 15, 2013, 27 pp.
Extended Search Report from counterpart European Application No. 19219291.2, dated Mar. 13, 2020, 8 pp.
Wang et al., "An Overview of Routing Optimization for Internet Traffic Engineering," IEEE Communications Surveys & Tutorials; vol. 10, No. 1, Jan. 1, 2008, pp. 36-56.
Response filed Jun. 21, 2021 to the Extended Search Report from counterpart European Application No. 19219291.2, dated Mar. 13, 2020, 17 pp.
Awduche et al. "RSVP-TE: Extensions to RSVP for LSP Tunnels," Network Working Group, RFC 3209, Dec. 2001, 61 pp.
Oran, "OSI IS-IS Intra-domain Routing Protocol," RFC 1142, Network Working Group, Feb. 1990, 190 pp.

* cited by examiner

CLASS-BASED TRAFFIC ENGINEERING IN AN IP NETWORK

This application claims the benefit of U.S. Provisional Patent Application No. 62/864,851 filed on Jun. 21, 2019, the entire contents of which is incorporated by reference herein.

TECHNICAL FIELD

The disclosure relates to computer networks and, more specifically, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines information within the packet and forwards the packet in accordance with the accumulated topology information.

In some examples, routers may implement one or more traffic engineering protocols to establish tunnels for forwarding packets through a selected path. For example, Multi-Protocol Label Switching (MPLS) is a mechanism used to engineer traffic patterns within Internet Protocol (IP) networks according to the routing information maintained by the routers in the network. By utilizing MPLS protocols, such as Resource Reservation Protocol with Traffic Engineering extensions (RSVP-TE) or Source Packet Routing in Networking (SPRING) with traffic extensions (SR-TE), routers can disseminate labels associated with destinations to forward traffic along a particular path through a network to a destination device, i.e., a Label Switched Path (LSP), using labels prepended to the traffic. RSVP-TE or SR-TE may use constraint information, such as bandwidth availability, to compute paths and establish LSPs along the paths within a network. RSVP-TE or SR-TE may use bandwidth availability information accumulated by an Interior Gateway Protocol (IGP) link-state routing protocol, such as an Intermediate System-Intermediate System (IS-IS) protocol or an Open Shortest Path First (OSPF) protocol. In some configurations, the routers may also be connected by an IP infrastructure in which case IP-in-IP or Generic Routing Encapsulation (GRE) tunneling or other IP tunneling can be used between the routers. However, such traffic engineering mechanisms have hardware requirements or hardware limitations to realize traffic engineering in IP networks.

SUMMARY

In general, techniques are described for class-based traffic engineering in an IP network. For example, network devices, e.g., routers, of an IP network may establish one or more constrained traffic engineered paths using a link-state protocol, such as IGP, without using signaling protocols, such as RSVP or SPRING, or encapsulating packets over MPLS.

In one example implementation, a router in an IP network advertises its capability to compute one or more paths (referred to here as "constrained paths") using certain path computation algorithms (PCAs). For example, a router advertises capability message (e.g., an IGP message) that indicates its capability to compute a constrained path (referred to herein as "capability message" or "capability IGP message"). The capability message includes path computation algorithm information (referred to as "path computation information"), such as a traffic class that specifies a specific class of data flows that is associated with the constrained path, a metric type (e.g., traffic engineering, IGP, delay, etc.), an objective function (e.g., to minimize accumulative path weight), and/or one or more path constraints (e.g., links or nodes to exclude from the constrained path) on the topology for computing the constrained path to a destination. In some examples, the router may alternatively, or additionally, advertise a flow specification filter (e.g., as a Type-Length-Value (TLV)) to identify a specific type of flow(s) the algorithm is applicable to. An egress router of the IP network advertises a reachability message (e.g., an IGP message) including a destination IP prefix by which other routers of the IP network may reach the egress router and includes, for example, the traffic class (or flow specification filter) to specify the way in which the other routers of the IP network are to reach the egress router. The egress router advertises the reachability message including the traffic class or flow specification filter to request that other routers of the IP network compute a constrained path towards the destination IP prefix.

The routers that are capable of computing constrained paths associated with the traffic class or flow specification filter may, in addition to computing a default IGP path using, for example, Constrained Shortest Path First (CSPF), configure the router to forward traffic on a constrained path to the destination IP prefix. In this way, instead of sending a data packet over a default shortest IGP path, routers of the IP network may steer the data packet hop-by-hop along the constrained path as requested by the egress router.

The techniques described herein may provide one or more technical advantages that realizes a practical application. For example, by providing class-based traffic engineering in an IP network using IGP, routers of an IP network may perform traffic engineering using constraints without using MPLS protocols, such as RSVP-TE and SR-TE, that require new hardware or data plane support to provide traffic engineering. Moreover, the techniques described herein natively support IP forwarding for both IPv4 and IPv6, and therefore avoid the use of traffic engineering mechanisms that support only IPv4 or only IPv6. By performing one or more aspects of the techniques described herein, routers of an IP network may also avoid using IP-in-IP or GRE tunneling mechanisms that have limitations to the number of encapsulations and do not provide bandwidth guarantees.

In one example of the techniques described in this disclosure, a method includes receiving, by an egress network device of a plurality of network devices of an Internet Protocol (IP) network, a capability message from one or more of the plurality of network devices specifying a capability to compute a constrained path, wherein the capability message comprises path computation information including an identifier of a path computation algorithm to be used by the one or more of the plurality of network devices to reach the egress network device. The method also includes generating, by the egress network device, a reachability message requesting establishment of the constrained path to the egress network device, wherein the reachability message comprises a destination IP prefix address of the egress network device and the identifier from the path computation information received from the capability message. The method further includes sending, by the egress network device and to the plurality of network devices of the IP network, the routing message to request that the plurality of network devices compute the constrained path to reach the egress network device.

In another example of the techniques described in this disclosure, a method includes sending, by a network device of a plurality of network devices of an Internet Protocol (IP) network and from an egress network device of the plurality of network devices, a capability message to an egress device of the IP network, wherein the capability message specifies a capability to compute a constrained path, wherein the capability message comprises path computation information including an identifier of a path computation algorithm the network device uses to identify the constrained path to compute. The method also includes receiving, by the network device, a reachability message requesting establishment of a constrained path to the egress network device, wherein the reachability message comprises a destination IP prefix address of the egress network device and the identifier from the path computation information path computation information including the identifier of the path computation algorithm to be used by the network device to reach the egress network device. The method further includes computing, by the network device, the constrained path using the identifier of the path computation algorithm included in the reachability message. The method also includes configuring, by the network device, the network device to forward traffic on the constrained path toward the egress network device.

In another example of the techniques described in this disclosure, a network device includes a memory. The network device also includes one or more processors coupled to the memory, wherein the one or more processors are configured to receive a capability message from one or more network devices of a plurality of network devices of an Internet Protocol (IP) network specifying a capability to compute a constrained path to an egress network device of the IP network, wherein the capability message comprises path computation information including an identifier of a path computation algorithm to be used by the one or more of the plurality of network devices is to reach the egress network device. The one or more processors are further configured to generate a reachability message requesting establishment of the constrained path to the egress network device, wherein the reachability message comprises a destination IP prefix address of the egress network device and the identifier from the path computation information received from the capability message. The one or more processors are also configured to send, to the plurality of network devices of the IP network, the routing message to request that the plurality of network devices compute the constrained path to reach the egress network device.

The details of one or more examples are set forth in the accompanying drawings and the description below. Other features, objects, and advantages of the disclosure will be apparent from the description and drawings, and from the claims.

The details of one or more examples are set forth in the accompanying drawings and the description below. Other features, objects, and advantages will be apparent from the description and drawings, and from the claims.

DETAILED DESCRIPTION

Figure 1:
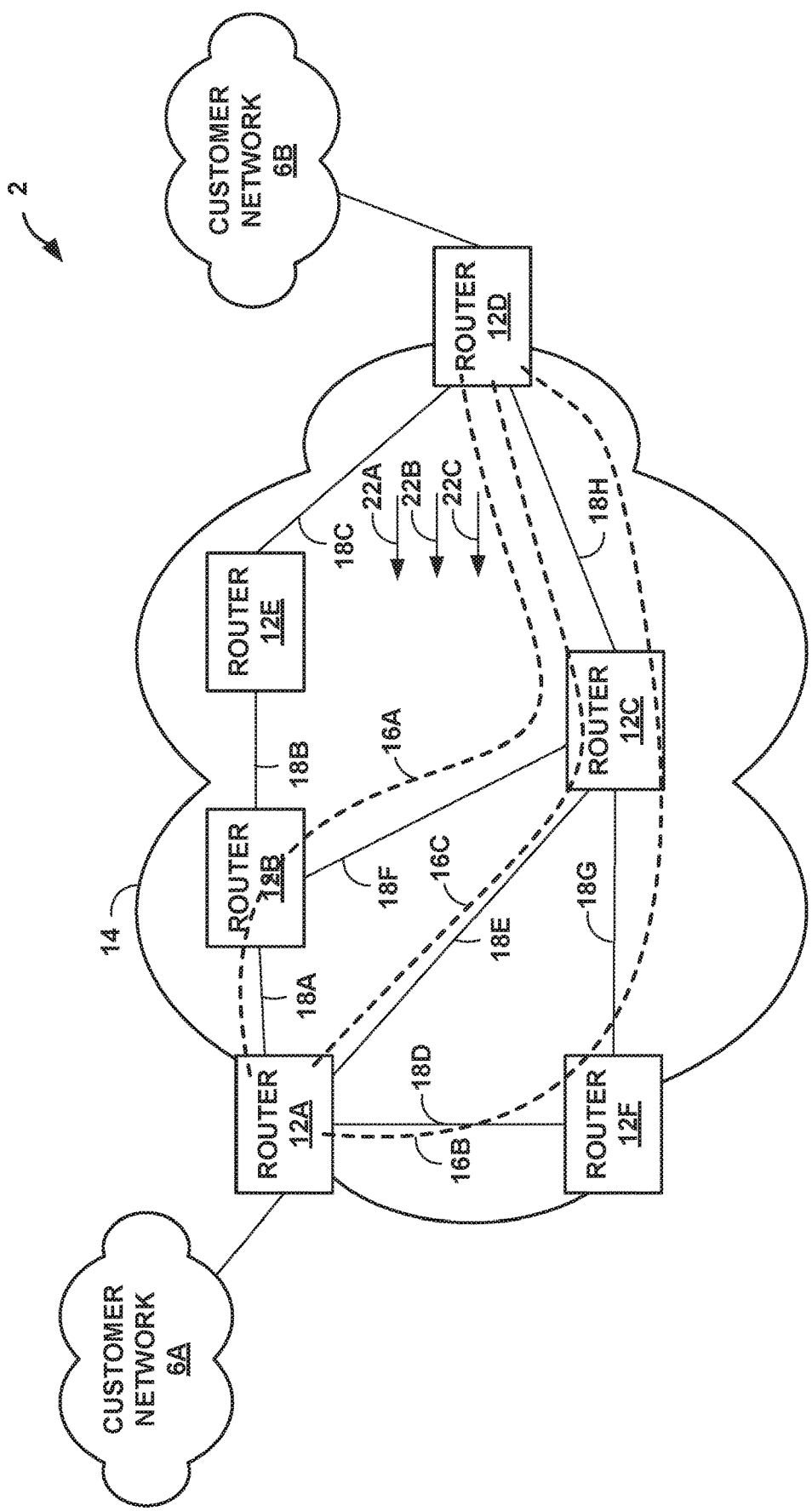
FIG. 1 is a block diagram illustrating an example network system in which network devices provide class-based traffic engineering in an IP network, in accordance with one or more aspects of the techniques described in this disclosure.

FIG. 1 is a block diagram illustrating an example network system 2 in which network devices provide class-based traffic engineering in an Internet Protocol (IP) network, in accordance with one or more aspects of the techniques described in this disclosure. In the example of FIG. 1, network 14 may include network devices, such as routers 12A-12F (collectively, "routers 12"), to establish one or more constrained paths across one or more links, e.g., links 18A-18H (collectively, "links 18").

In some examples, network 14 may be a service provider network. For example, network 14 may represent one or more networks owned and operated by a service provider (which is commonly a private entity) that offer one or more services for consumption by customers or subscribers of customer networks 6A-6B (collectively, "customer networks 6"). In this context, network 14 is typically a layer 3 (L3) packet-switched network that provides L3 connectivity between a public network, such as the Internet, and one or more customer networks 6. Often, this L3 connectivity provided by service provider network 14 is marketed as a data service or Internet service, and subscribers in customer networks 6 may subscribe to this data service. Network 14 may represent an L3 packet-switched network that provides data, voice, television and any other type of service for purchase by subscribers and subsequent consumption by the subscribers in customer networks 6. In the illustrated example of FIG. 1, network 14 may comprise a network infrastructure that supports the Internet Protocol and may be referred to herein as IP network 14.

Customer networks 6 may be local area networks (LANs), wide area networks (WANs), or other private networks that include a plurality of subscriber and/or customer devices (not shown). In some examples, customer networks 6 may comprise distributed network sites of the same customer enterprise. In other examples, customer networks 6 may belong to different entities. Subscriber and/or customer devices (not shown) within customer network 6 may include personal computers, laptops, workstations, personal digital assistants (PDAs), wireless devices, network-ready appliances, file servers, print servers or other devices capable of requesting and receiving data via network 14. While not shown in the example of FIG. 1, network system 2 may include additional service provider networks, customer networks and other types of networks, such as access networks, private networks, or any other type of network.

Routers 12 represent any network device that routes or otherwise forwards traffic through network 14 by performing IP-based forwarding, such as encapsulating IP addresses and de-encapsulating IP addresses. Typically, routers 12 represent an L3 packet-switching device that operates at L3 to exchange routing information that describes a current topology of network 14 using a routing protocol, such as an Interior Gateway Protocol (IGP) or a Border Gateway Protocol (BGP). Routers 12 then process this routing information, selecting paths through its representation of the topology of network 12 to reach all available destinations to generate forwarding information. In other words, routers 12 reduce these paths to so-called "next hops" which identify interfaces to which to forward packets destined for a particular destination, where the forwarding information includes this list of next hops. Routers 12 then install this forwarding information in a forwarding component of the router, whereupon the forwarding component forwards received traffic in accordance with the forwarding information. In general, the forwarding component may be any component for forwarding packets between interfaces of the router, such as forwarding circuits or processors programmed with forwarding tables.

In the illustrated example of FIG. 1, routers 12 may establish one or more constrained paths, e.g., paths 16A-16C (collectively, "paths 16"). Router 12A may represent an ingress router of paths 16 and router 12D may represent an egress router of paths 16. Router 12B, 12C, 12E, and 12F, are intermediate or transit routers along one or more paths, e.g., paths 16. Each of paths 16 may represent a flow of traffic along the path from ingress router 12A to egress router 12D. All network traffic sent on a path 16 must follow the established path. In the example of FIG. 1, path 16A is established across links 18A, 18F, and 18H. Path 16B is established across links 18D, 18G, and 18H. Path 16C is established across links 18E and 18H. The configuration of network system 2 is merely an example. For example, network system 2 may include any number of transit routers and paths. Nonetheless, for ease of description, only routers 12A-12F and paths 16A-16C are illustrated in the example of FIG. 1.

In some examples, paths 16 may be established based on constraint information.

Constraint information may include topology related constraints, such as excluded links/nodes, color-coded exclusions or inclusions for certain Quality of Service (QoS) or Service Level Agreement (SLA) groups (e.g., certain nodes or links are only used for traffic having a higher QoS or certain SLA), and others. In some instances, network devices may advertise constraint information using, for example, an Interior Gateway Protocol (IGP) link-state protocol, such as the Intermediate System-Intermediate System (IS-IS) protocol or the Open Shortest Path First (OSPF) protocol to configure a constrained path. Based on the advertised constraint information, routers may in some instances establish paths using Generic Route Encapsulation (GRE) or IP-in-IP tunneling protocols to establish traffic engineered tunnels based on the advertised constraints. However, network devices that implement IP-in-IP or GRE encapsulations are limited in the number of IP/GRE headers (e.g., based on the number of routers along the path) that an ingress router may push to realize an end-to-end constrained path. For example, the IP/GRE headers each occupy a specific number of bytes (e.g., IP header may occupy 20-bytes; IP in GRE encapsulation may occupy 24-bytes). Because the ingress router pushes an IP/GRE header for each router that the traffic is to traverse, this requires additional processing for each router for the constrained path. Moreover, IP-in-IP or GRE encapsulations do not provide bandwidth guarantees, is loosely routed (which may result in undesirable/unexpected data flow) and may hide a flow identifier that transit routers may use to perform Equal Cost Multi-path (ECMP) hashing.

Alternatively, network devices may use MPLS for traffic engineering using constraints. In these examples, network devices use Resource Reservation Protocol with Traffic Engineering extensions (RSVP-TE) and Source Packet Routing in Networking (SPRING) with traffic extensions (SR-TE) to steer traffic based on constraint information. However, such MPLS-specific traffic engineering mechanisms require hardware and data plane support. For example, to implement Segment Routing over an IPv6 data plane (SRv6), network devices must have hardware that can support the number of Segment identifiers (SIDs) encoded in a segment routing header (SRH). Similarly, to implement Segment Routing over an IPv6+(SRv6+), network devices must have hardware that can support the extensions to the control plane and data plane (e.g., mapping of short SIDs to 128-bit SID/v6 addresses). The MPLS traffic engineering mechanisms described above are limited only to IPv6, supports strict and loose routing, requires extensions to existing control plane to advertise topological and service SIDs, may require a steep learning curve for operators (e.g., for the variations of transport SIDs, service SIDs, etc.), and may be limited to centralized bandwidth management for implementing constraint based paths.

In accordance with the techniques described herein, routers 12 may provide class-based traffic engineering in an IP network using, for example, IGP (e.g., IS-IS or OSPF), to provide class-based traffic engineering in IP network 14 without using signaling protocols, such as RSVP or SPRING. In the illustrated example of FIG. 1, a non-egress router, e.g., any of routers 12A, 12B, 12C, 12E, and 12F, may advertise its capability to compute one or more paths (referred to here as "constrained paths") using certain path computation algorithms (PCAs). For example, a router advertises a capability message (e.g., an IGP message) that includes path computation algorithm information (referred to as "path computation information"), such as a traffic class that specifies a specific class of data flows that is associated with the constrained path, a metric type, an objective function (e.g., to minimize accumulative path weight), and/or one or more path constraints (e.g., links or nodes to exclude from the constrained path) on the topology for computing the constrained path to a destination.

For example, routers may advertise a traffic class (e.g., represented as a number) that specifies a specific class of data flows associated with the path computation algorithm. For example, routers 12A, 12B, and 12C may each advertise a capability message including a traffic class (TC1) associated with a path computation algorithm (e.g., PCA1) to compute constrained path 16A (e.g., low-latency constrained path). Similarly, routers 12A, 12F, and 12C may each advertise a capability message including a traffic class (TC2) associated with a path computation algorithm (e.g., PCA2) to compute constrained path 16B (e.g., color-coded constrained path). Alternatively, or additionally, routers may include a flow specification filter (flow-spec), as a type-length-value (TLV), for example, to identify a specific type of data flow (e.g., data from a particular source prefix) that the path computation algorithm is associated with. Additional examples of the flow-spec are described in P. Marques, et al., "Dissemination of Flow Specification Rules," Request for Comments 5575, August 2009, the entire contents of which is incorporated by reference herein.

A metric type may include traffic engineering metrics, delay, IGP metrics, and others. Additional examples of IGP metrics are described in F. Le Faucheur, et al., "Use of Interior Gateway Protocol (IGP) Metric as a second MPLS Traffic Engineering (TE) Metric," Request for Comments 3785, May 2004, the entire contents of which is incorporated by reference herein. Additional examples of other metrics are described in S. Previdid, Ed., et al., "IS-IS Traffic Engineering (TE) Metric Extensions," Request for Comments 7810, May 2016, the entire contents of which is incorporated by reference herein.

A path constraint may include topology related constraints, such as excluded links/nodes, color-coded exclusions or inclusion for certain Quality of Service (QoS) or Service Level Agreement (SLA) groups (e.g., certain nodes or links are only used for traffic having a higher QoS or certain SLA), and others. In some examples, egress router 12D may use IGP to specify an Exclude Route Object (XRO) that identifies certain links/nodes to be excluded from the computed path. Additional examples of XRO are described in CY. Lee, et al., "Exclude Routes—Extensions to Resource Reservation Protocol-Traffic Engineering (RSVP-TE)," Request for Comment 4874, April 2007, the entire contents of which is incorporated by reference herein. Egress router 12D may in some examples use IGP to specify resource affinities of the computed path via a series of 32-bit maps. Additional examples of resource affinities are described in D. Awduche, et al., "RSVP-TE: Extensions to RSVP for LSP Tunnels," Request for Comments: 3209, December 2001, the entire contents of which is incorporated by reference herein.

In the example of FIG. 1, PE routers 12A, 12B, and 12C may each send a capability message including path computation information to indicate its capability to compute a low-latency path. In this example, PE routers 12A, 12B, and 12C may each send a capability message including a traffic class associated with the path computation algorithm to compute low-latency path, e.g., constrained path 16A. The capability message may also include a metric type, e.g., delay, and other constraints (if applicable).

Egress router 12D may advertise reachability information using IGP. For example, egress router may advertise a reachability message (e.g., an IGP message) including a destination IP prefix by which other routers of the IP network 14 may reach egress router 12D. Egress router 12D may also specify the one or more ways in which the other routers are to reach egress router 12D. To provide class-based traffic engineering in IP network 14, egress router 12D may also include a traffic class or flow specification filter in the reachability message to specify the way in which routers of IP network 14 are to reach egress router 12D.

As one example, egress router 12D may advertise a reachability message including a traffic class associated with a path computation algorithm that other routers have indicated their capability in computing. For example, egress router 12D may advertise a reachability message including the traffic class associated with the path computation algorithm to compute constrained path 16A. Alternatively, or additionally, egress router 12D may advertise a reachability message including the flow specification filter associated with the path computation algorithm to compute constrained path 16A. As further described below, egress router 12D may in some examples request additional paths in order to optimize service for certain types of traffic classes.

In the illustrated example of FIG. 1, egress router 12D may advertise reachability message 22A including a destination IP prefix of 4.4.4.2/32 and a traffic class or flow specification filter associated with a path computation algorithm by which routers in IP network 14 are to compute a constrained path to destination IP prefix of 4.4.4.2/32. For example, reachability message 22A may include a traffic class TC1 associated with the path computation algorithm PCA1 to compute a low-latency path, e.g., constrained path 16A. In this example, by advertising reachability message 22A with traffic class TC1, egress router 12D may request other routers of IP network 14 to use a low-latency path to reach destination IP prefix of 4.4.4.2/32.

Each of routers 12 that is capable of computing the low-latency constrained path identified by the traffic class TC1 included in reachability message 22A may, in addition to computing a default shortest IGP path 16C (referred to herein as "default path 16C"), using CSPF, for example, compute the constrained path 16A to egress router 12D. For example, ingress router 12A may compute a constrained path 16A to destination IP prefix of 4.4.4.2/32. In the example of FIG. 1, ingress router 12A may determine the latency of its outgoing links, e.g., links 18A, 18D, and 18E. Using TCP ping messages, for example, router 12A may determine the latency of links 18A, 18D, and 18E, and determine that link 18A has a lower latency than for the link to the default shortest IGP path 16C (e.g., link 18E). In response, router 12A may configure its routing information to recognize traffic for this traffic class to be forwarded on constrained path 16A. For example, router 12A may configure in its routing information a flow filter criteria for identifying flows to be forwarded on the constrained path 16A, such as traffic including a specific flow label. In some examples, the flow filter may include a Differentiated Services Code Point (DSCP) value, such as an Expedited Forwarding (EF) class, Assured Forwarding (AF) class, or the like. Further examples of the flow label are described in S. Amante, et al., "IPv6 Flow Label Specification," Internet Engineering Task Force (IETF), Request for Comments (RFC) 6437, November 2011, and in T. Dreibholz, "An IPv4 Flowlabel Option," Network Working Group, draft-dreibholz-ipv4-flowlabel-29, Mar. 6, 2019, the entire contents of both of which are incorporated by reference herein. Router 12A may also configure forwarding information with a next hop to router 12B via link 18A.

Transit router 12B may determine the latency of its outgoing links, e.g., links 18B and 18F. Router 12B may determine that link 18F satisfies the low-latency requirement for the low-latency path requested by reachability message 22A. In response, router 12B may configure its routing information to recognize traffic for this traffic class to be forwarded on constrained path 16A (e.g., such as traffic including a specific flow label). Router 12B may also configure its forwarding information with a next hop to router 12C via link 18F. Other routers, e.g., router 12C, capable of computing the low-latency path may determine the latency of its outgoing links and configure its routing information to recognize traffic for this traffic class to be forwarded on constrained path 16A (e.g., such as traffic including a specific flow label). Router 12C may also configure its forwarding information with a next hop to egress router 12D via link 18H.

When ingress router 12A receives a packet destined for destination IP prefix of 4.4.4.2/32, ingress router 12A may perform a lookup of its routing information and determine that the packet has a destination IP prefix of 4.4.4.2/32 and a flow label associated with constrained path 16A. Ingress router 12A performs a lookup of its forwarding information and sends the packet on constrained path 16A instead of a default shortest IGP path, e.g., path 16C. Each of the transit routers on constrained path 16A (e.g., routers 12B and 12C), may each receive the packet, perform a lookup of its routing information and determine that the packet has a destination IP prefix of 4.4.4.2/32 and a flow label associated with constrained path 16A. Router 12B performs a lookup of its forwarding information and sends the packet on the next hop along constrained path 16A toward egress router 12D. When egress router 12D receives the packet, egress router 12D forwards the packet to the ultimate destination.

In another example implementation, egress router 12D may advertise a reachability message 22B including a destination IP prefix of 4.4.4.1/32 and a different traffic class associated with another path computation algorithm that is used to compute a constrained path to the destination IP prefix of 4.4.4.1/32. For example, reachability message 22B may include a second traffic class (TC2) associated with a second path computation algorithm (PCA2) to compute a constrained path 16B using color-coded constraints. By advertising reachability message 22B with the second traffic class TC2, egress router 12D may request that other routers of IP network 14 compute a color-coded constrained path to forward video data on the color-coded constrained path.

Each of routers 12 that is capable of computing the color-coded constrained path identified by the traffic class TC2 included in reachability message 22B may compute the constrained path 16B to egress router 12D. For example, in addition to computing a default shortest IGP path, ingress router 12A may also configure its routing information to recognize traffic for this traffic class to be forwarded on constrained path 16B. For example, router 12A may configure in its routing information a flow filter criteria for identifying flows to be forwarded on the constrained path 16B, such as traffic including a specific flow label. Router 12A may also configure its forwarding information to forward traffic along constrained path 16B to destination IP prefix of 4.4.4.1/32. In the example of FIG. 1, ingress router 12A may determine the associated color of links 18A, 18E, and link 18D, and determines that link 18D can be used to for the color-coded constrained path requested by reachability message 22B. In response, router 12A may configure its routing information to recognize traffic for this traffic class to be forwarded on constrained path 16B (e.g., such as traffic including a specific flow label). Router 12A may also configure its forwarding information with a next hop to router 12F via link 18D.

Each of routers 12, e.g., routers 12F and 12C, that is capable of computing the color-coded constrained path identified by the traffic class TC2 included in reachability message 22B may compute the constrained path 16B to egress router 12D. For example, routers 12F and 12C may each configure its routing information to recognize traffic for this traffic class to be forwarded on constrained path 16B (e.g., by configuring a flow filter criteria for identifying traffic with a specific flow label). Each of routers 12F and 12C may also configure its forwarding information to forward traffic matching the second traffic class along constrained path 16B to destination IP prefix of 4.4.4.1/32. In this example, transit routers 12F, 12C on constrained path 16B may each configure forwarding information with a next hop to router 12C and 12D via links 18G and 18H, respectively.

When ingress router 12A receives a packet destined for IP prefix of 4.4.4.1/32, ingress router 12A may determine whether the packet matches the flow filter. For example, ingress router 12A may perform a lookup of its routing information to determine whether the packet includes a flow label matching the flow filter and if so, performs a lookup of its forwarding information based on the destination IP prefix, and determines that the next hop is to router 12F on a color-coded constrained path 16B. Each of the routers on constrained path 16B (e.g., routers 12F and 12C), may each receive the packet, perform a lookup of its routing information and determine that the packet includes a flow label associated with the color-coded constrained path 16B, perform a lookup of its forwarding information to determine the next hop, and send the packet to a next hop on constrained path 16B toward egress router 12D. When egress router 12D receives the packet, egress router 12D forwards the packet to the ultimate destination.

In some examples, one or more routers 12 may not be capable of computing constrained paths as requested by egress router 12D. In these examples, routers of IP network 14 may use, by default, the shortest path computing using an IGP shortest path algorithm. For example, ingress router 12A may configure forwarding information of the ingress router to forward traffic along default path 16C to destination IP prefix of 4.4.4.1/32. Ingress router 12A may determine, based on the default IGP shortest path, e.g., OSPF, that the shortest route to destination IP prefix of 4.4.4.1/32 is through router 12C. Ingress router 12A may compute a next hop to router 12C via link 18F. Router 12C may also configure a forwarding state (e.g., next hop) of the router to forward traffic along the shortest path to reach destination IP prefix of 4.4.4.1/32, e.g., path 16C.

When ingress router 12A receives a packet destined for IP prefix of 4.4.4.1/32, ingress router 12A may perform a lookup of its routing information to determine whether the packet matches the flow filter (e.g., includes a flow label). If the packet does not match the flow filter, ingress router 12A sends the packet along default path 16C with a next hop to router 12C. Router 12C may receive the packet, perform a lookup of its routing information and determines the packet does not match the flow filter, perform a lookup of its forwarding information to determine that the next hop is to egress router 12D, and sends the packet to egress router 12D, which in turn forwards the packet to the ultimate destination.

The techniques described herein may provide one or more technical advantages that provide a practical application. For example, by providing class-based traffic engineering in an IP network using IGP, routers of an IP network may perform traffic engineering using constraints without using MPLS protocols, such as RSVP-TE and SR-TE, that require new hardware or data plane support to provide traffic engineering. Moreover, the techniques described herein natively support IP forwarding for both IPv4 and IPv6, and therefore avoids the use of traffic engineering mechanisms that support only IPv4 or only IPv6. By performing one or more aspects of the techniques described herein, routers of an IP network may also avoid using IP-in-IP or GRE tunneling mechanisms that have limitations to the number of encapsulations and does not provide bandwidth guarantees.

Figure 2:
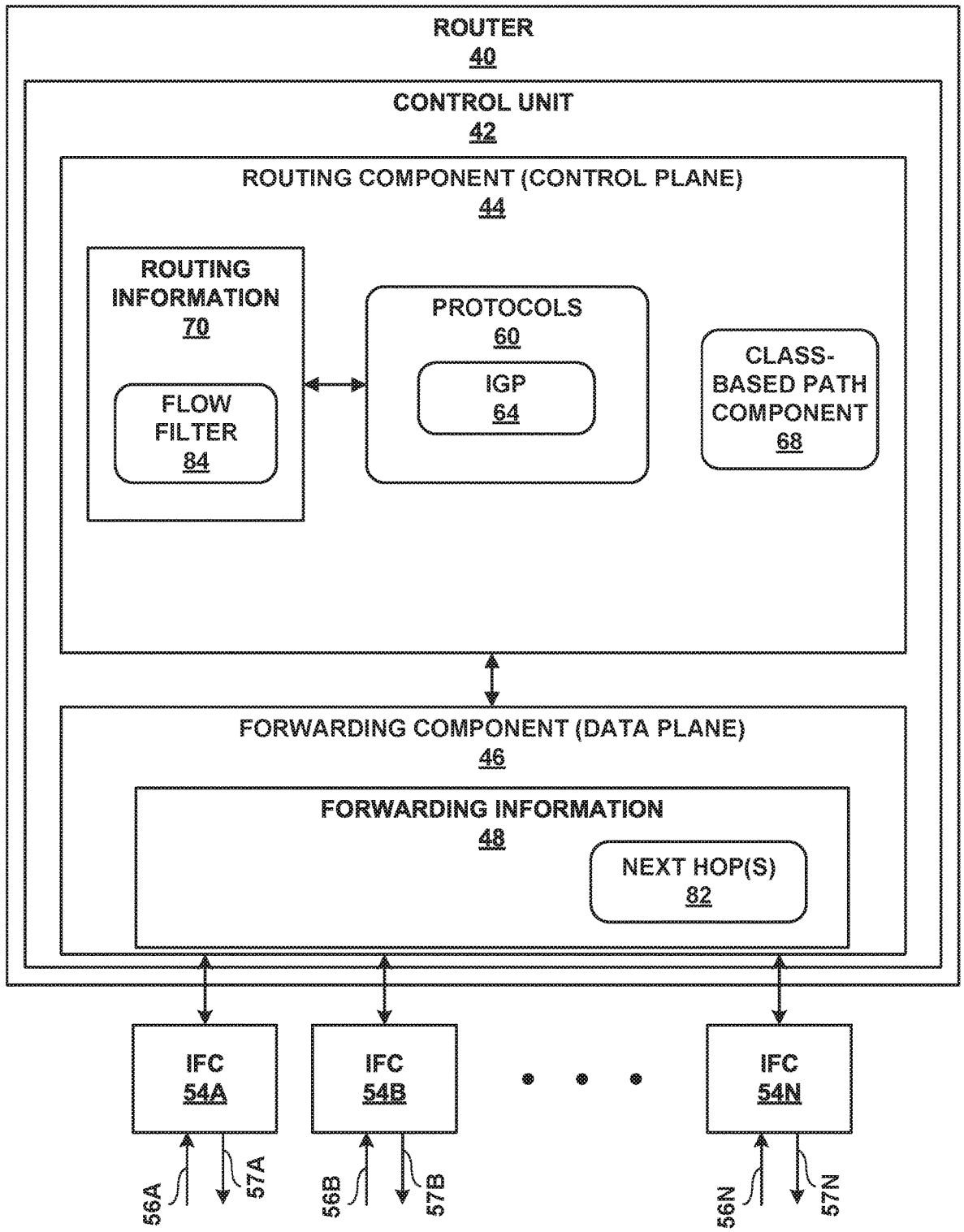
FIG. 2 is a block diagram illustrating a router performing various aspects of the techniques described in this disclosure.

FIG. 2 is a block diagram illustrating an example router 40 that performs various aspects of the techniques described in this disclosure. Router 40 may represent any of routers 12 of FIG. 1. While described with respect to router 40, the techniques may be implemented by any other type of network device capable of implementing at least routing protocols including a resource reservation protocol, such as RSVP. Thus, while described with respect to router 40, the techniques should not be limited to router 40 described with respect to the example of FIG. 3.

In the example of FIG. 2, router 40 includes interface cards 54A-54N ("IFCs 54") that receive and send data units, such as packet flows, via inbound links 56A-56N and outbound links 57A-57N, respectively. Router 40 may include a chassis (not shown) having a number of slots for receiving a set of cards, including IFCs 54. Each card may be inserted into a corresponding slot of the chassis for electrically coupling the card to routing component 44 via high-speed switch (not shown), which may comprise, for example, switch fabric, switchgear, a configurable network switch or hub, or other high-speed switching mechanisms. IFCs 54 may be coupled to network links 56A-56N and 57A-57N via a number of physical interface ports (not shown). Generally, IFCs 54 may each represent one or more network interfaces by which router 40 may interface with links of a network, such as links 18 as shown in the examples of FIG. 1.

In general, router 40 may include a control unit 42 that determines routes of received packets and forwards the packets accordingly via IFCs 54. In the example of FIG. 2, control unit 42 includes routing component 44 (control plane) that configures and controls packet forwarding operations applied by packet forwarding component 46 (data plane).

Routing component 44 may include routing information 70. Routing information 70 may describe the topology of the network in which router 40 resides, and may also describe various routes within the network and the appropriate next hops for each route, i.e., the neighboring routing devices along each of the routes. Routing component 44 analyzes the information stored in routing information 70 to generate forwarding information, e.g., forwarding information 48. Routing component 44 then installs forwarding data structures into forwarding information 48 within forwarding component 46. Forwarding information 48 associates network destinations with specific next hops and corresponding interface ports within the forwarding plane. Routing component 44 selects specific paths through the IP network and installs the next hop along those specific paths in forwarding information 48 within forwarding component 46.

Routing component 44 provides an operating environment for various routing protocols 60 that execute at different layers of a network stack. Routing component 44 is responsible for the maintenance of routing information 70 to reflect the current topology of a network and other network entities to which router 40 is connected. In particular, routing protocols periodically update routing information 70 to accurately reflect the topology of the network and other entities based on routing protocol messages received by router 40. In the example of FIG. 2, protocols 60 may include IGP 64 to implement an IGP protocol to exchange routing information with other routing devices in a network (e.g., IP network 14) in order to discover the network topology and update routing information 70. In the examples described in this disclosure, IGP 64 may be a link-state routing protocol such as open shortest path first (OSPF) in accordance with one or more of J. Moy, "OSPF Version 2," Request for Comments 2328, April 1998, R. Coltun, et al., "OSPF for IPv6," Request for Comments 6845, July 2008, N. Sheth, et al., "OSPF Hybrid Broadcast and Point-to Multipoint Interface Type," Request for Comments 6845, January 2013, and A. Lindem, et al., "OSPFv4 LSA Extendibility," Internet Draft for the Network Working Group, draft-acee-ospfv4-lsa-extend-01.txt, July 2013, the entire contents of each of which is incorporated by reference herein. In some examples, IGP 64 may include an IS-IS routing protocol that implements an IGP for exchanging routing and reachability information within a routing domain in accordance with D. Oran, OSI IS-IS Intra-domain Routing protocol," Request for Comments 1142, February 1990, the entire contents of which is incorporated by reference herein. The protocols may be implemented as executable software instructions executing on one or more processors.

In accordance with the techniques described in this disclosure, router 40 may extend IGP 64 to provide class-based traffic engineering in an IP network. In an example in which router 40 is a non-egress router, class-based path component 68 of router 40 may extend IGP 64 to generate a capability message including path computation information to specify its capability to compute constrained paths. For example, class-based path component 68 may extend IGP 64 to generate a capability message including a traffic class associated with a path computation algorithm, a metric type, an objective function (e.g., to minimize accumulative path weight), and/or one or more path constraints (e.g., links or nodes to exclude from the constrained path) on the topology for computing the constrained path to a destination.

In response to receiving a reachability message from an egress router (e.g., egress router 12D of FIG. 1) including a traffic class (e.g., TC1), class-based path component 68 of router 40 may compute a constrained path (e.g., low-latency constrained path) to the egress router using the path computation algorithm identified by the traffic class. Class-based path component 68 may generate forwarding information for forwarding component 46 to forward a packet to a next hop along the constrained path. For example, routing component 44 analyzes the destination IP prefix and the traffic class included in the reachability message received from the egress router to generate forwarding information 48 within forwarding component 46. Forwarding information 48 associates the network destination of the path (e.g., the destination IP prefix) with specific next hop and corresponding interface port within the forwarding plane. For example, routing component 44 may use, e.g., TCP ping messages, to determine latency of outbound links 57. Class-based path component 68 may instruct routing component 44 to configure, using the path computation algorithm one or more next hops 82 in forwarding information 48 that causes router 40 to forward traffic destined for the destination IP prefix of the egress router (e.g., router 12D of FIG. 1) through one of IFCs 54 connected to the next hop of the low-latency constrained path via the outbound link that satisfies the latency requirements.

In some examples, class-based path component 68 may configure a flow filter 84 in routing information 70. As described herein, router 40 may use flow filter 84 to identify packet flows for which to forward to a specific constrained path. For example, when router 40 receives a packet destined for a destination IP prefix of an egress router, router 40 may determine whether the packet includes, e.g., the flow label or DSCP value, that matches the flow filter 84 (e.g., the specific traffic class) in the routing information 70. If the packet matches the flow filter 84, router 40 may perform a lookup of forwarding information 48 to determine next hop 82, and forwards the traffic through one of IFCs 54 connected to next hop 82 of a constrained path that is associated with the flow filter. If the packet does not match the flow filter 84, router 40 may forward the traffic through one of IFCs 54 connected to the next hop of a path computed based on a default IGP shortest path.

For an example in which router 40 is operating as an egress router of an IP network (e.g., router 12D of FIG. 1), class-based path component 68 of router 40 may extend IGP 64 to generate a reachability message including a destination IP prefix to reach router 40 and information indicating the one or more ways in which routers of the IP network are to reach router 40 through the destination IP prefix. For example, class-based path component 68 may extend IGP 64 to generate a reachability message comprising a traffic class or flow specification filter advertised by other routers of the IP network. In some examples, class-based path component 68 may extend IGP 64 to generate a reachability message including a traffic class that specifies a specific class of data flows associated with a path computation algorithm. Router 40 may advertise the reachability message to other routers in the IP network to request that the routers compute a constrained path based on the traffic class or flow specification filter.

Figure 3:
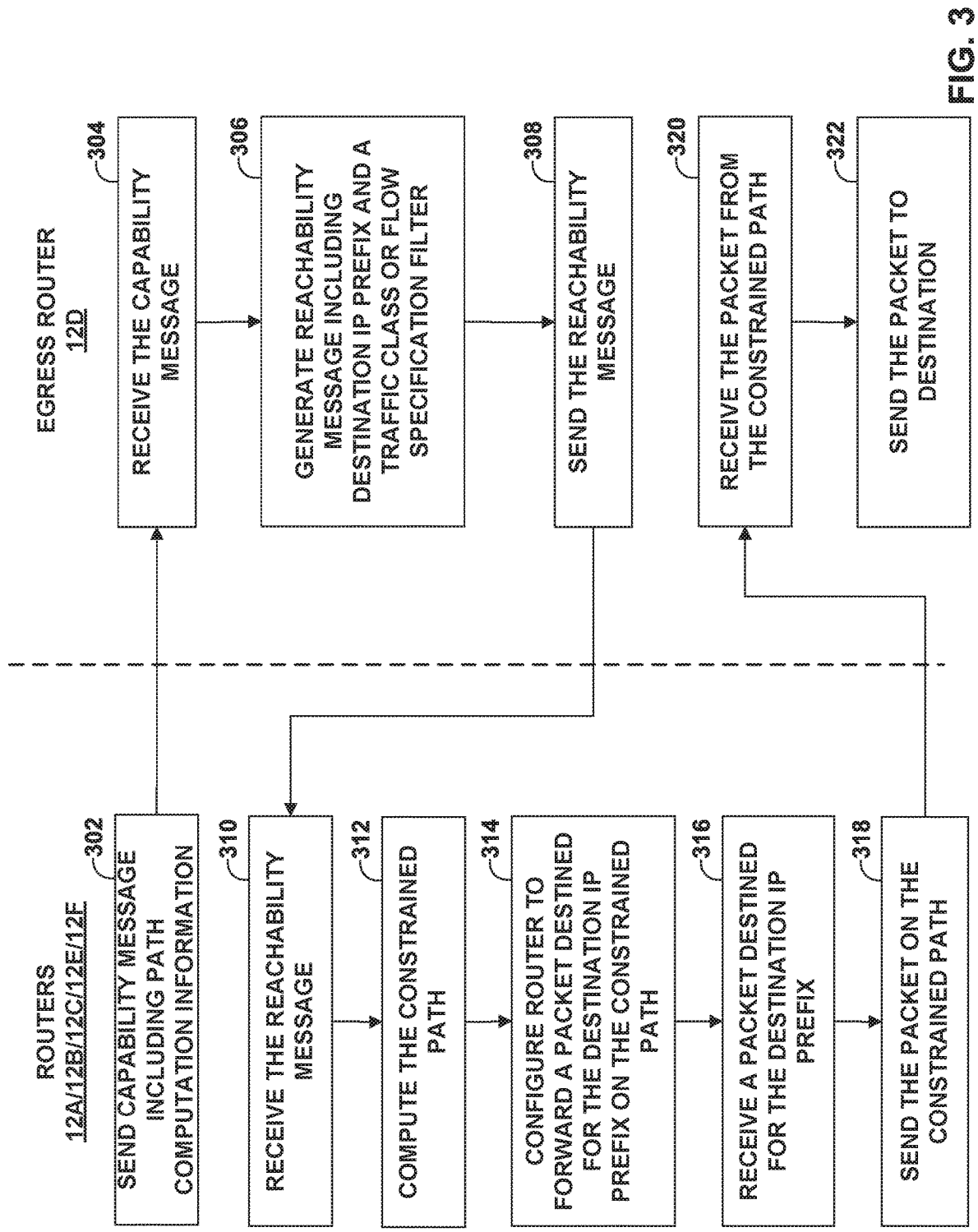
FIG. 3 is a flowchart illustrating an example operation of class-based traffic engineering in an IP network, in accordance with one or more aspects of the techniques described herein.

Although described for purposes of example with respect to a router, router 40 may be more generally a network device having routing functionality, and need not necessarily be a dedicated routing device. The architecture of router 40 illustrated in FIG. 3 is shown for example purposes only. The techniques of this disclosure are not limited to this architecture. In other examples, router 40 may be configured in a variety of ways. In one example, some of the functionally of control unit 42 may be distributed within IFCs 54. In another example, control unit 42 may comprise a plurality of packet forwarding engines operated as slave routers.

Control unit 42 may be implemented solely in software, or hardware, or may be implemented as a combination of software, hardware, or firmware. For example, control unit 42 may include one or more processors that execute program code in the form of software instructions. In that case, the various software components/modules of control unit 42 may comprise executable instructions stored on a computer-readable storage medium, such as computer memory or hard disk.

FIG. 3 is a flowchart illustrating an example operation of class-based traffic engineering in an IP network, in accordance with one or more aspects of the techniques described in this disclosure. FIG. 3 is described for purposes of example with respect to computer network 2 of FIG. 1.

Non-egress routers, e.g., routers 12A, 12B, 12C, 12E, and 12F, may send a capability message (e.g., IGP message) including path computation information (302). For example, the capability message includes path computation information, such as a traffic class that specifies a specific class of data flows that is associated with the constrained path, a metric type (e.g., traffic engineering, IGP, delay, etc.), an objective function (e.g., to minimize accumulative path weight), and/or one or more path constraints (e.g., links or nodes to exclude from the constrained path) on the topology for computing the constrained path to a destination. In some examples, the router may alternatively, or additionally, advertise a flow specification filter (e.g., as a Type-Length-Value (TLV)) to identify a specific type of flow(s) the algorithm is applicable to. In this example, the path computation information may include a first traffic class TC1 associated with a path computation algorithm (PCA1) to compute a low-latency constrained path, a metric types for delay and, in some examples, one or more path constraints (e.g., excluded links/nodes).

Egress router 12D receives the capability messages from the non-egress routers (304). In response, egress router 12D may generate a reachability message (e.g., IGP message) including a destination IP prefix and a traffic class or flow specification filter to specify the way in which routers of the IP network are to forward traffic to the egress router (306). For example, egress router 12D may generate a reachability message including a destination IP prefix (e.g., 4.4.4.2/32) and traffic class associated with a path computation algorithm PCA1 to compute a low-latency constrained path to egress router 12D.

Egress router 12D may send the reachability message to other routers in IP network 14 to request that the other routers compute the constrained path based on the information (e.g., traffic class) indicating the way in which the plurality of network devices of the IP network is to reach the egress router (308). The other routers, e.g., routers 12A, 12B, 12C, 12E, and 12F, receive the reachability message (310). The routers capable of computing the constrained path specified in the reachability message may configure routing information to recognize traffic to be forwarded on the constrained path and forwarding information to forward traffic on the constrained path. For example, the routers in the IP network 14 (e.g., routers 12A-12C) may each compute the constrained path according to the path computation algorithm specified by the traffic class in the reachability message (312). Each of the routers 12A-12C may configure the router to forward a packet destined for the destination IP prefix on the constrained path (314). In this example, ingress router 12A may configure its routing information to recognize traffic for a specific traffic class (e.g., TC1) to be forwarded on a constrained path (e.g., constrained path 16A). For example, ingress router 12A may configure its routing information with a flow filter criteria for identifying flows to be forwarded on the constrained path 16A, such as traffic including a specific flow label. Router 12A may also configure forwarding information with a next hop to steer the traffic along constrained path 16A. Routers 12B and 12C may each configure its routing with a flow filter criteria to identify flows to be forwarded on constrained path 16A and forwarding information with a next hop via links 18F and 18H, respectively, that satisfy the low-latency requirement.

When routers 12A-12C receive a packet destined for the destination IP prefix (316), each of the routers performs a lookup of its routing information to determine whether the incoming packet matches the flow filter (e.g., includes a flow label associated with constrained path 16A), and if so, performs a lookup of its forwarding information to determine the next hop for constrained path 16A, and sends the packet on constrained path 16A (318). For example, ingress router 12A may receive a packet destined for a destination IP prefix of 4.4.4.2/32 with a flow label associated with constrained path 16A, ingress router 12A may identify based on the flow filter that the packet is to be forwarded on a low-latency constrained path 16A to egress router 12D. Ingress router 12A performs a lookup of forwarding information to determine the next hop on constrained path 16A and send the packet on constrained path 16A. When egress router 12D receives the packet from a constrained path (320), egress router 12D may send the packet to the ultimate destination (322).

Figure 4:
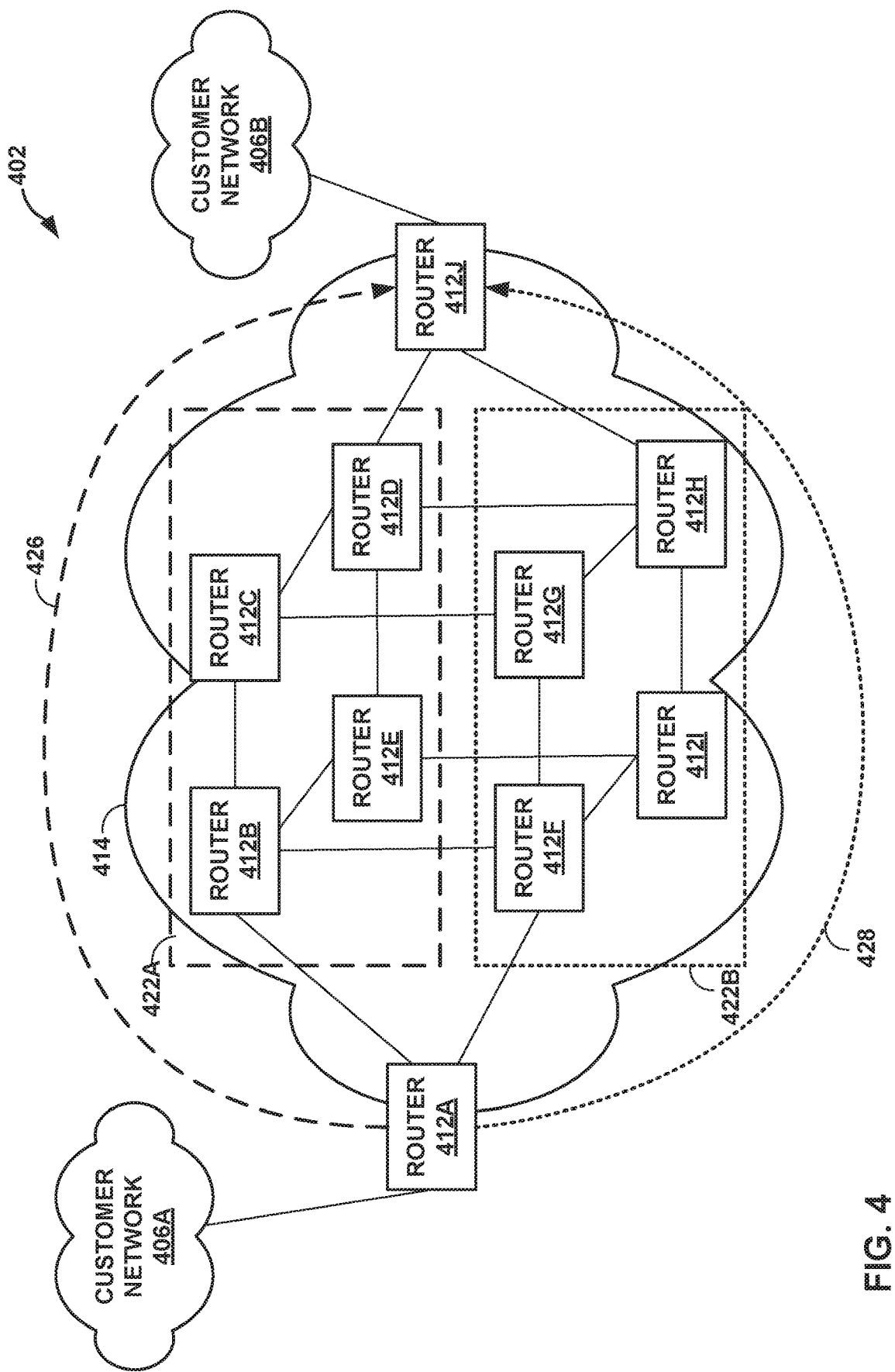
FIG. 4 is a block diagram illustrating another example network system in which network devices provide class-based traffic engineering in an IP network, in accordance with one or more aspects of the techniques described in this disclosure.

FIG. 4 is a block diagram illustrating another example network system 402 in which network devices provide class-based traffic engineering in an IP network, in accordance with one or more aspects of the techniques described in this disclosure. FIG. 4 shows an example network 414 of routers 412A-412J that can provide connectivity over two distinct planes, e.g., planes 422A-422B (collectively, "planes 422"). Plane 422A includes routers 412B-412E, where links connecting routers 412B-412E are associated with a specific group (e.g., color-coded with a first color (e.g., green)). In this example, routers 412B-412E advertise their capability of computing path(s) using a first traffic class (TC1) of a traffic algorithm. The TC1 path computation information may include a metric type (e.g., include affinity green) and a constraint (e.g., minimize IGP metric).

Plane 422B includes routers 412F-412I, where links connecting routers 412F-412I are associated with a specific group (e.g., color-coded with a second color (e.g., red)). In this example, routers 412F-412I advertise their capability of computing path(s) using a second traffic class (TC2) of traffic algorithm. The TC2 path computation information may include a metric type (e.g., include affinity red) and a constraint (e.g., minimize IGP metric).

In this example, routers 412A and 412J may only support the IGP shortest path algorithm that is unconstrained. It is assumed that router 412A marks each of the two flows (e.g., 426 and 428) that require to be routed over the disjoint planes 422 with a respective Differentiated Services Code Point (DSCP), e.g. AF1 (green) and AF2 (red), to correspond to TC1 and TC2, respectively.

Router 412J advertises the destination IP prefix of router 412J with the indication to the network 414 to compute an additional path for each of TC1 and TC2 classes towards router 412J (in addition to default IGP shortest path). In this example, each of routers 412B-412E computes path 426 for TC1 to reach router 412J and installs its next-hop, for example, into routing information or forwarding information along with the flow-filter criteria identifying TC1 (e.g., DSCP=AF1 for TC1 and DSCP=AF2 for TC2).

Traffic arriving from router 412B destined to router 412J that match the TC1 classification will be routed towards router 412C and router 412E using, for example, ECMP. In turn, packets arriving on routers 412C or 412E that match TC1 will be forwarded towards router 412D. Finally, router 412D forwards packets destined to router 412J over the link between routers 412D and 412J.

Similarly, traffic arriving from router 412F destined to router 412J that match the TC2 classification will be routed towards router 412G or router 412I using, for example, ECMP. In turn packets arriving on routers 412G or 412I that match TC2 will be forwarded towards router 412H. Finally, router 412H forwards packets destined to router 412J over the link between routers 412H and 412J.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
receiving, by an egress network device of a plurality of network devices of an Internet Protocol (IP) network, a capability message from one or more of the plurality of network devices specifying a capability to compute a constrained path, wherein the capability message comprises path computation information including an identifier of a path computation algorithm to be used by the one or more of the plurality of network devices to identify the constrained path to compute;
generating, by the egress network device, a reachability message requesting establishment of the constrained path to the egress network device, wherein the reachability message comprises a destination IP prefix address of the egress network device and the identifier of the path computation algorithm from the path computation information received from the capability message; and
sending, by the egress network device and to the plurality of network devices of the IP network, the reachability message to request that the plurality of network devices compute the constrained path to reach the egress network device.

2. The method of claim 1, wherein the capability message and reachability message each comprises an Interior Gateway Protocol (IGP) message.

3. The method of claim 1,
wherein the identifier comprises a traffic class that specifies a specific class of one or more data flows that are to be sent on the constrained path if the one or more data flows match the traffic class, and
wherein the path computation information comprises one or more metric types and one or more constraints of the constrained path to the egress network device.

4. The method of claim 3, wherein the one or more metric types comprises at least one of traffic engineering metrics, delay, and Interior Gateway Protocol (IGP) metrics.

5. The method of claim 3, wherein the one or more constraints specifies one or more links or nodes to be excluded from the constrained path.

6. A method comprising:
sending, by a network device of a plurality of network devices of an Internet Protocol (IP) network, a capability message to an egress device of the IP network, wherein the capability message specifies a capability to compute a constrained path, wherein the capability message comprises path computation information including an identifier of a path computation algorithm to be used by the network device to identify the constrained path to compute;

receiving, by the network device, a reachability message requesting establishment of a constrained path to the egress network device, wherein the reachability message comprises a destination IP prefix address of the egress network device and the identifier of the path computation algorithm from the path computation information to be used by the network device to compute the constrained path to reach the egress network device;

computing, by the network device, the constrained path using the identifier of the path computation algorithm included in the reachability message; and configuring, by the network device, the network device to forward traffic on the constrained path toward the egress network device.

7. The method of claim 6, wherein the capability message and reachability message each comprises an Interior Gateway Protocol (IGP) message.

8. The method of claim 6,
wherein the identifier comprises a traffic class that specifies a specific class of one or more data flows that are to be sent on the constrained path if the one or more data flows match the traffic class, and
wherein the path computation information comprises one or more metric types, and one or more constraints of the constrained path to the egress network device.

9. The method of claim 8, wherein the one or more metric types comprises at least one of traffic engineering metrics, delay, and Interior Gateway Protocol (IGP) metrics.

10. The method of claim 8, wherein the one or more constraints specifies one or more links or nodes to be excluded from the constrained path.

11. The method of claim 6, wherein configuring the network device to forward traffic on the constrained path toward the egress network device comprises:
configuring routing information of the network device to include a flow filter criteria to identify traffic to be sent on the constrained path.

12. The method of claim 11, wherein the flow filter criteria comprises whether an incoming packet destined for a destination IP prefix of the egress network device includes a flow label associated with the constrained path.

13. The method of claim 12, further comprising:
receiving, by the network device, a packet destined for a destination IP prefix of the egress network device;
determining whether the received packet includes the flow label associated with the constrained path; and
sending, in response to determining that the received packet includes the flow label associated with the constrained path, the packet on the constrained path.

14. The method of claim 12, further comprising,
receiving, by the network device, a packet destined for a destination IP prefix of the egress network device;
determining whether the received packet includes the flow label associated with the constrained path; and
sending, in response to determining that the received packet does not include the flow label associated with the constrained path, the packet on a shortest path computed using Interior Gateway Protocol IGP shortest path algorithm.

15. A network device comprising:
a memory;
one or more processors coupled to the memory, wherein the one or more processors are configured to:
receive a capability message from one or more network devices of a plurality of network devices of an Internet Protocol (IP) network specifying a capability to compute a constrained path to an egress network device of the IP network, wherein the capability message comprises path computation information including an identifier of a path computation algorithm to be used by the one or more of the plurality of network devices to identify the constrained path to compute;
generate a reachability message requesting establishment of the constrained path to the egress network device, wherein the reachability message comprises a destination IP prefix address of the egress network device and the identifier of the path computation algorithm from the path computation information received from the capability message; and
send, to the plurality of network devices of the IP network, the reachability message to request that the plurality of network devices compute the constrained path to reach the egress network device.

16. The network device of claim 15, wherein the capability message and the reachability message each comprises an Interior Gateway Protocol (IGP) message.

17. The network device of claim 15,
wherein the identifier comprises a traffic class that specifies a specific class of one or more data flows that are to be sent on the constrained path if the one or more data flows match the traffic class, and
wherein the path computation information comprises one or more metric types and one or more constraints of the constrained path to the egress network device.

18. The network device of claim 17, wherein the one or more metric types comprises at least one of traffic engineering metrics, delay, and Interior Gateway Protocol (IGP) metrics.

19. The network device of claim 17, wherein the one or more constraints specifies one or more links or nodes to be excluded from the constrained path.

* * * * *